US009157228B2

(12) United States Patent
Brandt et al.

(10) Patent No.: US 9,157,228 B2
(45) Date of Patent: Oct. 13, 2015

(54) FASTENER

(75) Inventors: Edward Robert Brandt, Sycamore, IL (US); Bryan Robert Piendel, Rolling Meadows, IL (US); Geronimo E. Lat, Mundelein, IL (US); Samuel F. Collura, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 273 days.

(21) Appl. No.: 13/572,798

(22) Filed: Aug. 13, 2012

(65) Prior Publication Data
US 2013/0045063 A1  Feb. 21, 2013

Related U.S. Application Data

(60) Provisional application No. 61/524,372, filed on Aug. 17, 2011.

(51) Int. Cl.
*F16B 15/00* (2006.01)
*E04B 1/26* (2006.01)
*F16B 12/24* (2006.01)
*F16B 5/00* (2006.01)

(52) U.S. Cl.
CPC .............. *E04B 1/2604* (2013.01); *F16B 12/24* (2013.01); *A47B 2230/007* (2013.01); *F16B 5/0056* (2013.01); *F16B 15/00* (2013.01)

(58) Field of Classification Search
CPC ......... F16B 15/00; F16B 5/0056; F16B 12/24

USPC .......................... 411/461–465, 477, 478, 912
See application file for complete search history.

(56) References Cited

U.S. PATENT DOCUMENTS

| 547,093 | A | * | 10/1895 | Starr | 411/464 |
|---|---|---|---|---|---|
| 1,904,288 | A | * | 4/1933 | McChesney | 411/464 |
| 3,507,384 | A | * | 4/1970 | Lippitt | 411/464 |
| 3,828,401 | A | | 8/1974 | Poyak | |
| 5,333,979 | A | | 8/1994 | Raffoni | |
| 6,241,445 | B1 | | 6/2001 | Godsted | |
| 2010/0260579 | A1 | * | 10/2010 | Curtis | 411/442 |

OTHER PUBLICATIONS

International Searching Authority (ISA/EPO), International Search Report and Written Opinion of the ISA, for PCT/US2012/051101, Mailing Date Dec. 14, 2012, 12 pages.

* cited by examiner

*Primary Examiner* — Roberta Delisle
(74) *Attorney, Agent, or Firm* — Maurice E. Finnegan, III; Beem Patent Law Firm

(57) ABSTRACT

A corrugated-typed fastener configured to couple a first substrate to a second substrate includes a bridge and a plurality of ribs, the ribs having a plurality of flutes. The flutes, and possibly the ribs, may be angled inwardly to form an apex disposed within the width of the fastener and pointing towards a center of the fastener. The ribs may extend outward from the bridge towards opposing ends of the fastener, and the ends may be at a different height than the bridge when viewing the fastener from the side. Alternatively, the ends may be at the same height as the bridge and also may be generally centered on the height of the fastener.

21 Claims, 3 Drawing Sheets

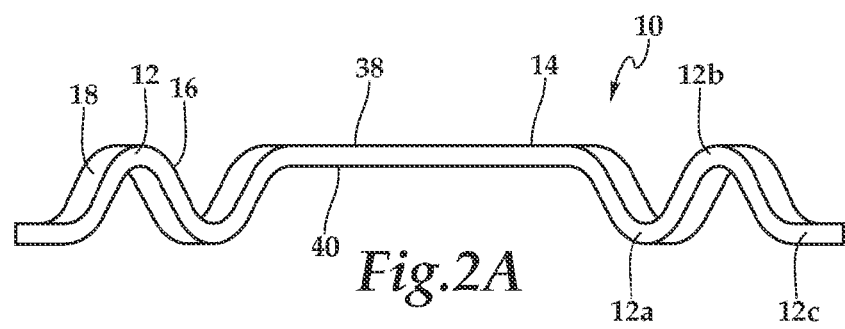
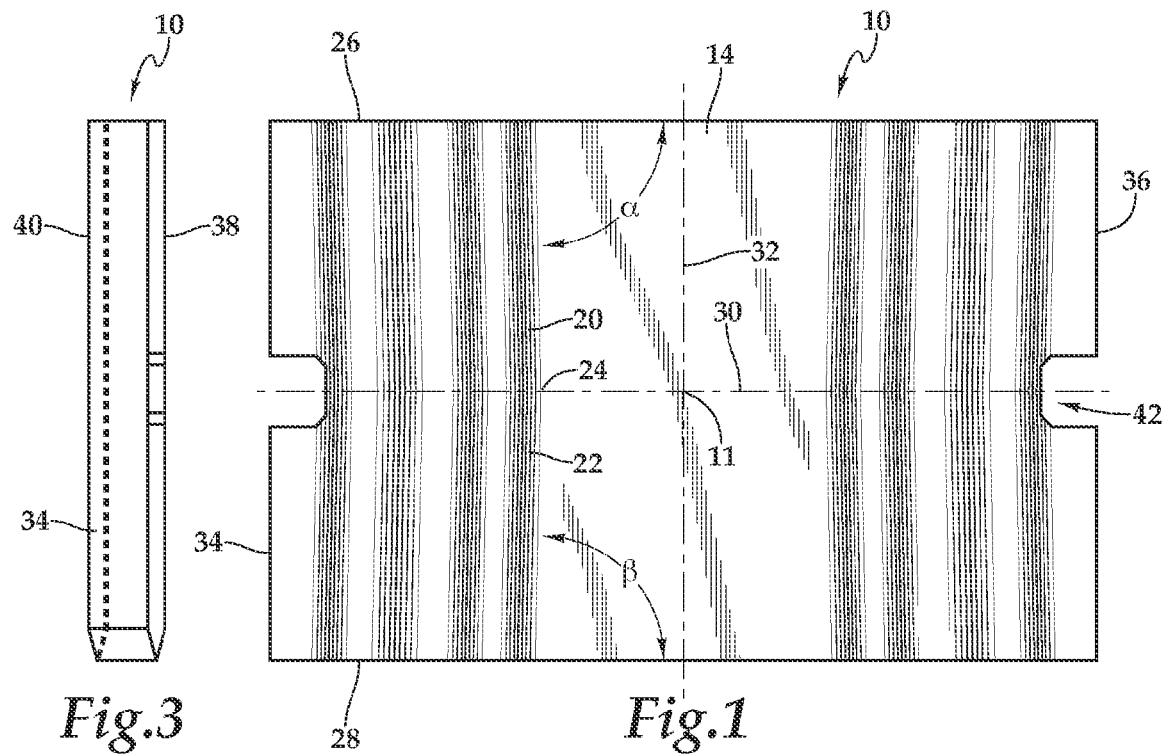
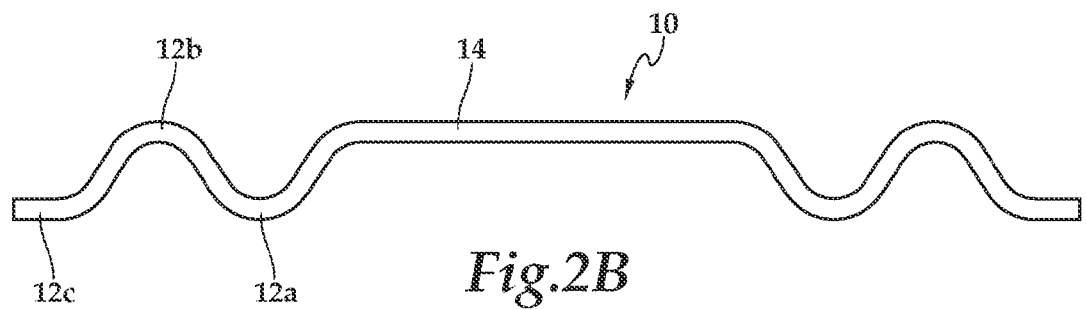

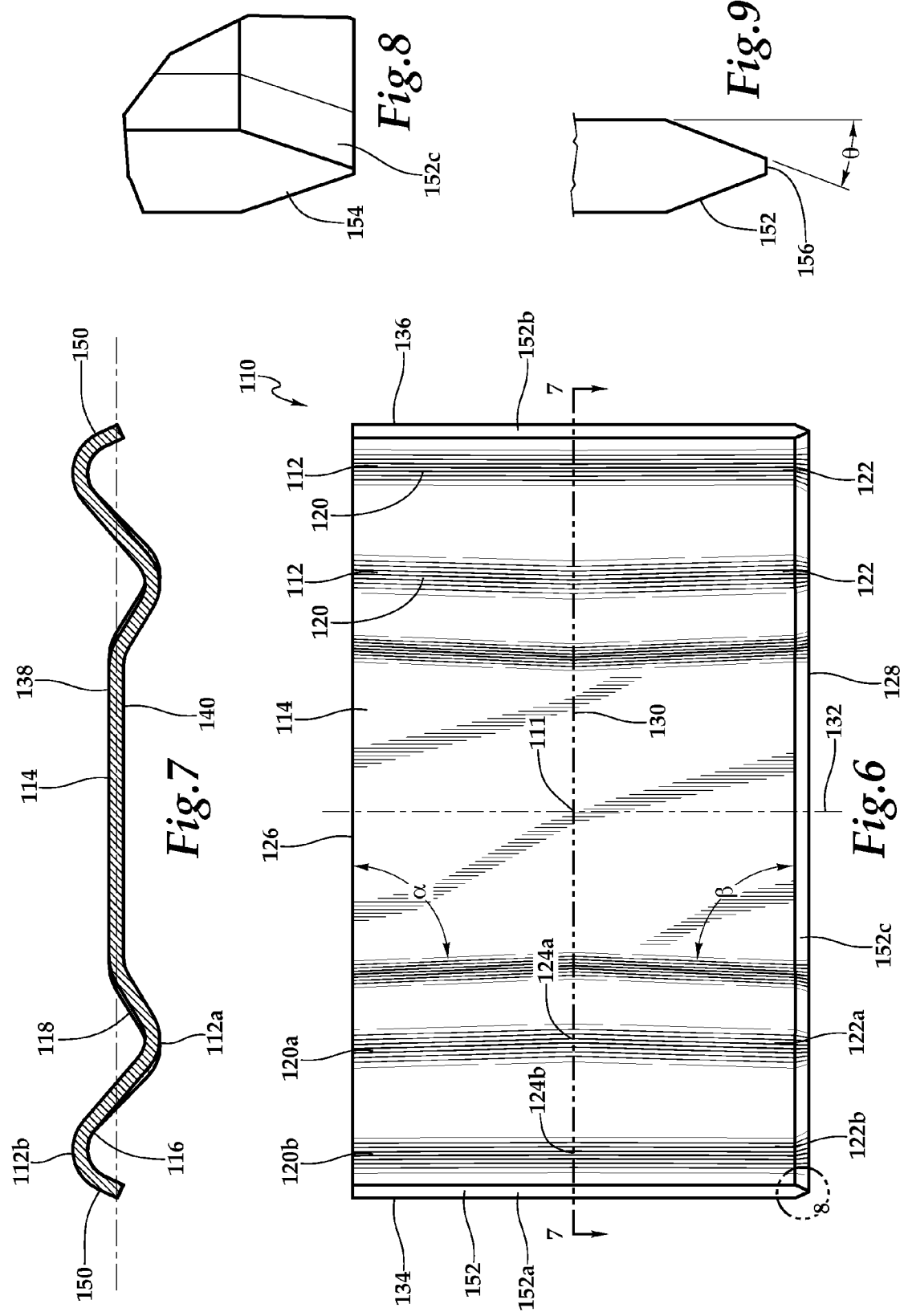

FASTENER

This application claims the benefit of priority from U.S. provisional application 61/524,372, filed Aug. 17, 2011.

BACKGROUND

It is possible to join abutting substrates such as wooden boards in several ways. The substrates may be altered to create mortise and tenon or dovetail joints that allow the boards to interface and abut. These processes may require the use of special jigs or templates or a high degree of user skill and a large amount of time if created by hand. Additionally, it is necessary to start with at least one substrate piece longer than its desired final length, requiring an additional expenditure for materials. Moreover, users often strengthen these joints with other methods, as discussed below.

In addition to machining the substrate to form a joint or in the alternative, adhesives may be used to bond one work surface to the other. Adhesives, such as wood glue, however, may seep beyond the boundaries of the joint and may require clean-up. It also often is necessary to clamp the substrates together and/or set the substrates aside for a period of time to allow the adhesive to set, adding time to the manufacture or assembly process.

Mechanical fasteners also may be used to join substrates together. Traditional wood-type screw fasteners may be employed, and may provide much stronger holding power as compared to adhesives or other fasteners, but these often require pre-drilling a hole through at least one of the substrates, which adds additional time to the manufacturing process. This pre-drilling step also may result in the pieces being misaligned if one piece moved relative to the other during the pre-drilling step or if they are drilled separately and measurements are not precise.

Alternatively, corrugated fasteners may be driven, e.g., using a pneumatic or powder-driven driving tool, into both substrates at the same time. These fasteners may span the joint between the substrates without requiring a separate pre-drilling step. Traditional corrugated fasteners, with or without the use of adhesives, may have significantly lower holding strengths than wood-type screw fasteners. In addition, they may lead to splitting of one or more of the substrates, particularly when driven in a direction generally aligned with the wood grain.

In addition to the drawbacks described above, many of these methods may result in formation of a gap between the two substrates. Sometimes the gap allows for a portion of one substrate to abut the second substrate while another portion is spaced from the substrate, i.e., the joint is skewed. Other times, the gap may span substantially the entire joint, such as when a wood screw cannot embed completely in the second substrate. In either case, the presence of a gap not only is unsightly, but it may lead to a weakened joint between substrates.

What is needed is a fastener that addresses the problems of the prior art.

SUMMARY

The present disclosure is directed to a fastener for joining a plurality of substrates. In an embodiment, the fastener may include a bridge, a first rib extending outward from a first end of the bridge, and a second rib extending outward from a second end of the bridge, where at least one of the first and second ribs comprises a first flute and a second flute that converge at an apex. At least one, and preferably both, of the first and second flutes angle inwards towards a center of the fastener, preferably at substantially the same degree. In addition, the apex may be substantially centrally disposed widthwise on the fastener. Moreover, the fastener may have a height, a first end disposed outward from the first rib and a second end disposed outward from the second rib, wherein the bridge is disposed at a different location along the height than the first end and second ends, i.e., the bridge is offset from the ends when viewing the fastener from the side. Additionally, the bridge may be substantially planar.

In another aspect, a fastener may include a bridge, which may be substantially planar, at least a first rib extending outward from a first end of the bridge and at least a second rib extending outward from a second end of the bridge. The fastener has a height, a first end disposed outward from the first rib and a second end disposed outward from the second rib, where the bridge is disposed at a different location along the height than the first and second ends. At least one of the first and second ribs may include a first flute and a second flute angled inwards towards a center of the fastener, e.g., between about 80 degrees and about 89 degrees. In addition, the first and second flutes may converge at a location generally equally spaced from the sides of the fastener.

In still another aspect, a corrugated fastener may include a bridge and a plurality of ribs extending outward from opposing sides of the bridge along a length of the fastener. At least one rib on each of the opposing sides may include a plurality of flutes, which may angle inwardly towards a center of the fastener, and a remainder of the at least one rib also may angle inwardly towards a center of the fastener. The flutes and the remainder of the at least one rib may angle inwardly at substantially the same angle, e.g., between about 80 degrees and about 89 degrees. Moreover, the fastener may have a first end proximate a first plurality of ribs and a second end proximate a second plurality of ribs, the first and second ends having a first height. Similarly, the bridge may have a second height, which may be different from the first height of the first and second ends, and the fastener also may have at least one rib having the second height.

In yet another aspect, a fastener may include a bridge, a first plurality of ribs extending outward from a first end of the bridge and a second plurality of ribs extending outward from a second end of the bridge, the first plurality of ribs comprising a first rib and a second rib. The first rib comprises a first flute and a second flute that converge at an apex, where at least one of the flutes angle inwards towards a center of the fastener, and where the second rib comprises a first and second flute that are substantially aligned with one another.

In a further aspect, a corrugated fastener may include a bridge and a plurality of ribs extending outward from opposing sides of the bridge along a length of the fastener. At least one rib on each of the opposing sides may include a plurality of flutes, the flutes angled inwardly towards a center of the fastener substantially symmetrically about an axis perpendicular to a direction of driving of the fastener. Conversely, at least one second rib on each of the opposing sides may include a second plurality of flutes that are substantially aligned with the direction of driving. In addition, at least one of a driving side, a first side, and a second side may include a ground edge. Moreover, each of the ribs on each side of the fastener may include a radius of curvature, where the radius of curvature of a rib proximate the bridge is larger than the radius of curvature of a rib on the opposite side of the first rib as the bridge.

These and other features and advantages are evident from the following description, with reference to the accompanying drawings.

BRIEF DESCRIPTION OF THE DRAWINGS

FIG. 1 is a top view of one embodiment of a fastener for securing a plurality of substrates together.

FIGS. 2A and 2B are side views of the fastener of FIG. 1.

FIG. 3 is an end view of the fastener of FIG. 1.

FIG. 6 is a top view of another embodiment of a fastener for securing a plurality of substrates together.

FIG. 7 is a section view through line 7-7 in FIG. 6.

FIG. 8 is a detail view of detail 8 in FIG. 6.

FIG. 9 is a detail side view of the fastener of FIG. 6.

DETAILED DESCRIPTION

Figure 4:
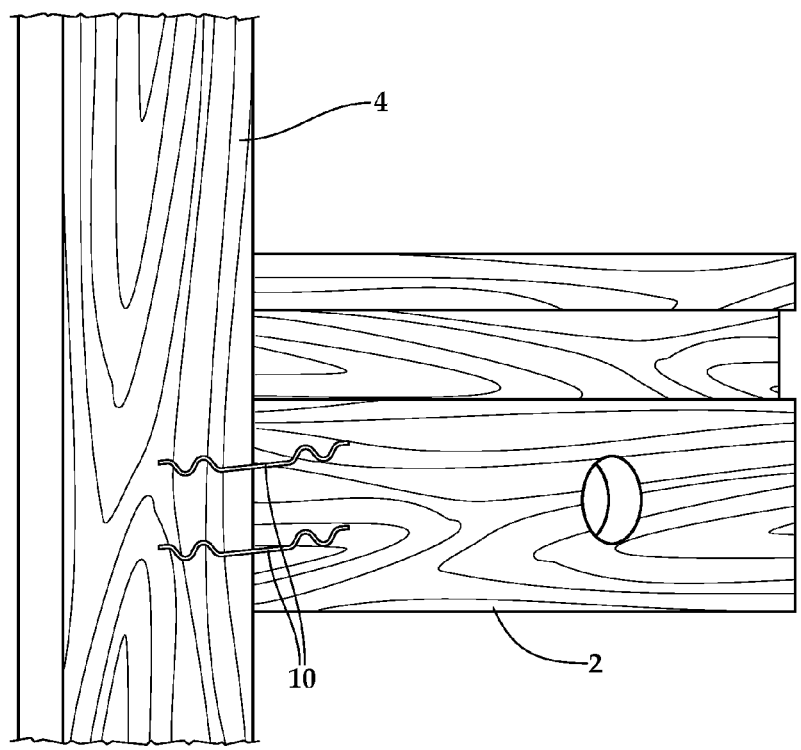
FIG. 4 is a side view of a plurality of fasteners embedded in a plurality of substrates.

Referring now to FIGS. 1-3, fastener 10 includes a plurality of ribs 12 separated by a bridge 14. Ribs 12 may be disposed in a generally sinusoidal or wave-like fashion, such that fastener 10 may be considered a corrugated-type fastener.

Fastener 10 may include a substantially identical number of ribs 12 on each side of bridge 14 such that fastener 10 is generally symmetrical about a widthwise centerline 32. In the embodiment seen in FIGS. 2A and 2B, fastener 10 includes three ribs 12a, 12b, 12c, spanning approximately 1½ periods of a wave, although more or fewer ribs may be used. Ribs 12a, 12b, 12c also may be substantially similarly spaced, although it is possible to alter converging angle 16 and/or diverging angle 18 to change spacing between ribs 12.

In addition, ribs 12a, 12b, 12c may have substantially similar amplitudes, although one or more ribs may be larger or smaller than the remaining ribs. In one aspect, ribs 12—and fastener 10 generally—may be between about ⅛" and about 1" high, preferably between about ¼" and about ¾" high, and in one embodiment, about ½" high. In another aspect ribs 12 and fastener 10 may be between about 1/64" and about ¼" high, preferably between about 1/16" and about ¼" high, and in one embodiment, about 1/10" high.

Each rib 12 may comprise one or more curvilinear or partially cylindrical portions between converging angle 16 and diverging angle 18. Whether seen as "hills" or "valleys," depending on the angle from which fastener 10 is viewed, ribs 12 may have substantially similar radii of curvature, e.g., between about 1/32" and about 1/16" or, in one embodiment, about 0.035"

Each rib 12 may include a first flute 20 and second flute 22 that converge at clamping apex 24. Apex 24 may be disposed at some point between first side 26 and second side 28, which may distribute a clamping force of fastener 10 more evenly along a vertical plane of assembly, thereby increasing joint strength and minimizing gaps between substrates 2, 4.

While apex may be located at any location along width of fastener 10, apex 24 preferably is generally equally spaced between first side 26 and second side 28, i.e., generally aligned with a lengthwise centerline 30 of fastener 10. One or both of first and second flutes may be angled inward toward center 11 of fastener 10. For example, if both first flute 20 and second flute 22 are angled inward, flutes may appear to form a chevron with apex 24 pointing toward center 11.

First flute 20 may form an angle, $\alpha$, with first side 26, and second flute 22 may form an angle, $\beta$, with second side 28, where both angles are measured relative to the portion of first side 26 and second side 28 nearer center 11. Preferably, $\alpha$ and $\beta$ may be substantially similar angles, e.g., within the desired manufacturing tolerances, although different angles are possible. For example, one or both of $\alpha$ and $\beta$ may be between about 75 degrees and about 89 degrees, preferably between about 80 degrees and about 89 degrees, still more preferably between about 85 degrees and about 89 degrees, and in one embodiment, about 87 degrees.

Preferably, each first flute on each rib 12a, 12b, and 12c includes a substantially equal angle, $\alpha$, and each second flute on each rib 12a, 12b, and 12c includes a substantially equal angle, $\beta$. In addition, angles $\alpha$ and $\beta$ may continue past first flute 20 and second flute 22 and may apply to a remainder of rib 12.

First side 26 and second side 28 may be generally planar, which plane may be generally parallel to a plane including lengthwise centerline 30. In the event that first side 26 and second side 28 are not generally parallel to that plane, angles $\alpha$ and $\beta$ may be calculated relative to that plane, i.e., to a plane that is generally perpendicular to fastener and generally parallel to the plane including lengthwise centerline 30.

Figure 5:
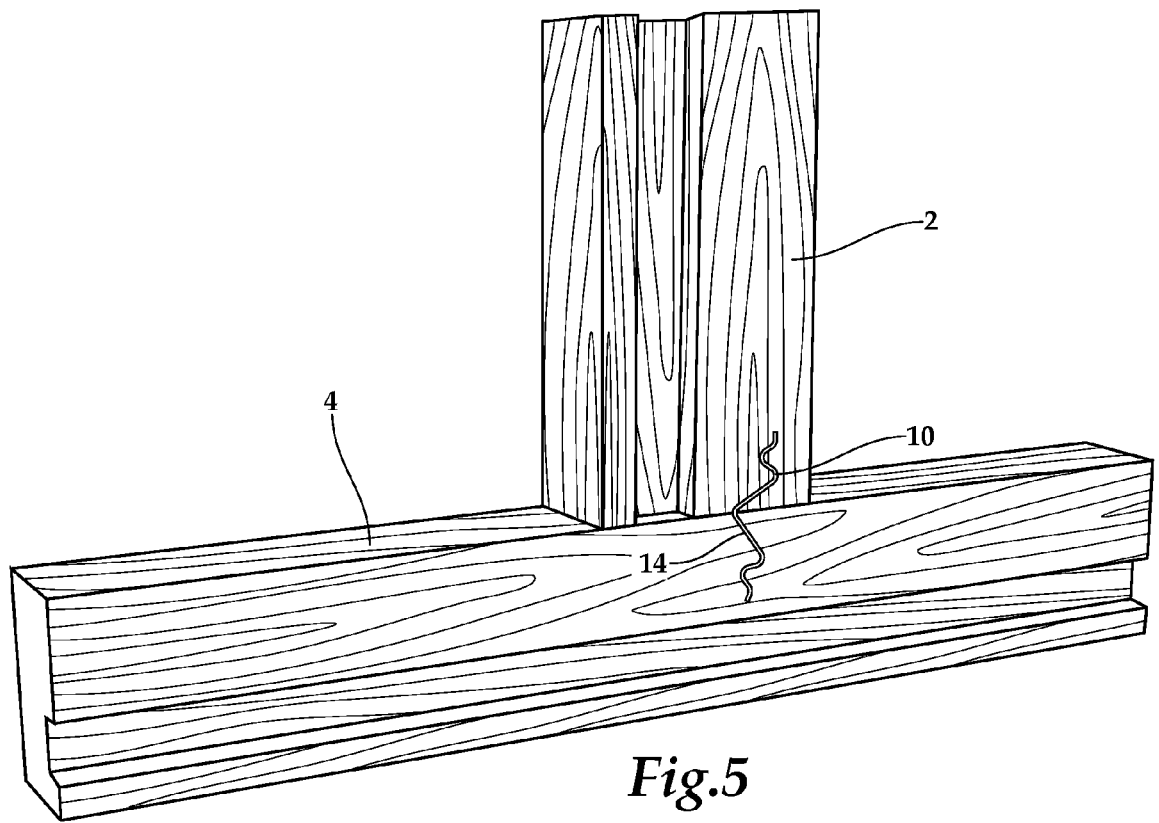
FIG. 5 is a perspective view of a second embodiment of a fastener embedded in a plurality of substrates.

Moving inward, fastener 10 may include bridge 14 spanning a width between innermost ribs 12. In one embodiment, as seen in FIG. 5, bridge 14 may be angled so as to form another chevron when viewed from the side or when sectioning fastener through a plane generally perpendicular to fastener and including lengthwise centerline 30. Preferably, however, bridge 14 is generally planar along its length and width, as seen in FIGS. 2A and 2B.

Staying with the side views of FIGS. 2A and 2B, it surprisingly was found that offsetting bridge 14 from first end 34 and/or second end 36 minimized wood splitting when fastener 10 was driven into wooden substrate 2, particularly when driven in a direction generally parallel to the grain of substrate 2. Bridge 14 may be offset from one or both of first end 34 and second end 36. In this embodiment, bridge 14 may be substantially aligned with lower rib 12b, while first end 34 and second end 36 may be substantially coincident with upper rib 12c. In other embodiments, bridge may disposed higher or lower than lower rib 12b, preferably while remaining misaligned with first end 34 and second end 36.

In still another embodiment, instead of being aligned with inner rib 12a, first end 34 and second end 36 may be aligned with rib 12b. In this embodiment, bridge 14 may not be substantially aligned with rib 12b but instead may be disposed at some other offset location.

Similarly, first and second ends may be disposed at a height somewhere between rib 12a and rib 12b. In that embodiment, bridge 14 preferably is disposed at a height substantially misaligned with first end 34 and second end 36, which height may be greater or less than heights of ribs 12a, 12b.

It also was found that increasing a length of bridge increased joint strength when substrate 2 was joined to a second substrate 4. As such, for use when joining wooden substrates 2, 4 such as ¾"×1⅛" boards, bridge 14 may be between about ¼" and about ½" long, preferably about ⅜" long, and in one embodiment, about 0.36" long. Bridge 14 may be longer or shorter, e.g., when joining substrates of different sizes.

Alternatively, length of bridge 14 may be viewed in proportion to total length of fastener 10. Bridge 14 may be between about 25% and about 50% of fastener length, preferably between about 30% and about 40%, and in one embodiment, about 39% of the fastener length.

Fastener 10 also may have a thickness between first surface 38 and second surface 40. In one embodiment, fastener 10 may be about 1/16" thick, but fastener 10 is not limited to this thickness.

Returning to FIG. 1, one or both of first end 36 and second end 38 may include an inwardly extending notch 42. Notch may comprise a plurality of linear segments or a combination of a curved surface and one or more generally linear segments between curved surface and fastener ends. While notches 42 may assist in collating fasteners or guiding fasteners along a magazine within a fastener driving tool, notches may not be necessary.

Turning now to FIGS. 6-9, in another aspect, fastener 110 similarly may include a plurality of ribs 112 disposed in a generally sinusoidal or wave-like fashion and separated by a bridge 114.

Fastener 110 may include a substantially identical number of ribs 112 on each side of bridge 114 such that fastener 110 is generally symmetrical about a widthwise centerline 132. As seen in FIG. 7, fastener 110 may include two ribs 112a, 112b on each side of bridge 114, spanning approximately 1 period of a wave, although more or fewer ribs may be used. Ribs 112a, 112b may be substantially similarly spaced, although, as seen in FIG. 7, it is possible to alter converging angle 116 and/or diverging angle 118 to change spacing between ribs 112.

In addition, ribs 112a, 112b may have substantially similar amplitudes, although one or more ribs may be larger or smaller than the remaining ribs. In one embodiment, ribs 112—and fastener 110 generally—may be between about 1/64" and about 1/4" high, preferably between about 1/16" and about 1/4" high, and in one embodiment, about 1/10" high.

Each rib 112 may comprise one or more curvilinear or partially cylindrical portions. Whether seen as "hills" or "valleys," depending on the angle from which fastener 110 is viewed, ribs 112 may have substantially similar radii of curvature, e.g., between about 1/32" and about 1/16" or, in one embodiment, about 0.03". Alternatively, outermost ribs 112b may angle more severely or may include a generally linear or generally planar portion proximate ends 134, 136, which may help increase clamping effect of fastener 110. For example, FIG. 7 illustrates that a radius of curvature between bridge 114 and rib 112a may be larger than a radius of curvature of rib 112b, e.g., about 0.038" as compared to about 0.03", causing angle 116 to be larger than angle 118. As such, rib 112a may have a longer wavelength than rib 112b.

As seen in FIG. 7, ribs 112b proximate ends 134, 136 may include a generally linear or generally planar portion 150. Portion 150 may form an angle between about 45 degrees and about 80 degrees with respect to a plane along the length of fastener 110, e.g., generally parallel to bridge 114, preferably between about 50 degrees and about 75 degrees, and in one embodiment, about 65 degrees.

As seen in FIG. 6, on each side of centerline 132, rib 112a may include a first flute 120a and second flute 122a that converge at clamping apex 124a, and rib 112b may include a first flute 120b and second flute 122b that converge at apex 124b. Apexes 124 may be disposed at some point between first side 126 and second side 128, which may distribute a clamping force of fastener 110 more evenly along a vertical plane of assembly, thereby increasing joint strength and minimizing gaps between substrates.

While apexes may be located at any location along width of fastener 110, apexes 124 preferably are generally equally spaced between first side 126 and second side 128, i.e., generally aligned with a lengthwise centerline 130 of fastener 110.

With respect to rib 112a, one or both of first and second flutes 120a, 122a may be angled inward toward center 111 of fastener 110. For example, if both first flute 120 and second flute 122 are angled inward, flutes may appear to form a chevron with apex 124 pointing toward center 111. Conversely, with respect to rib 112b, one or both of flutes 120b, 122b may not be angled inward toward center 111, such that flutes 120b, 122b may have collinear axes of curvature, which may be generally parallel to axis 132 or generally perpendicular to axis 130.

Turning back to rib 112a, first flute 120a may form an angle, $\alpha$, with first side 126, and second flute 122a may form an angle, $\beta$, with second side 128, where both angles are measured relative to the portion of first side 126 and second side 128 nearer center 111. Preferably, $\alpha$ and $\beta$ may be substantially similar angles, e.g., within the desired manufacturing tolerances, although different angles are possible. For example, one or both of $\alpha$ and $\beta$ may be between about 75 degrees and about 89 degrees, preferably between about 80 degrees and about 89 degrees, still more preferably between about 85 degrees and about 89 degrees, and in one embodiment, about 88 degrees.

First side 126 and second side 128 may be generally planar, which plane may be generally parallel to a plane including lengthwise centerline 130. In the event that first side 126 and second side 128 are not generally parallel to that plane, angles $\alpha$ and $\beta$ may be calculated relative to that plane, i.e., to a plane that is generally perpendicular to fastener and generally parallel to the plane including lengthwise centerline 130.

Turning to FIG. 7, in this aspect, bridge 114 may be substantially aligned with first end 134 and/or second end 136. Preferably, bridge 114 and ends 134, 136 are centrally disposed along a height of fastener 110. Alternatively, ends and bridge may be substantially aligned and may be disposed at a height other than generally along the midpoint of the height of fastener.

Bridge 114 may be between about 1/4" and about 1/2" long, preferably about 3/8" long, and in one embodiment, about 0.3" long. Bridge 114 may be longer or shorter, e.g., when joining substrates of different sizes. Alternatively, length of bridge 114 may be viewed in proportion to total length of fastener 110. Bridge 114 may be between about 25% and about 50% of fastener length, preferably between about 30% and about 40%, and in one embodiment, about 39% of the fastener length.

Fastener 110 also may have a thickness between first surface 138 and second surface 140. In one embodiment, fastener 110 may be about 1/64" thick, but fastener 110 is not limited to this thickness.

One or both of first end 134 and second end 136 may include an inwardly extending notch (not shown), which may be similar to notch 42 described above. While notches may assist in collating fasteners or guiding fasteners along a magazine within a fastener driving tool, notches may not be necessary.

At least one of ends 134, 136 and sides 126, 128 may include a ground edge 152. As seen in FIG. 6, in one aspect, at least side 128 includes ground edge 152c, where side 128 is the leading side that is driven into the substrates. Ground edge 152 may reduce thickness of material at side 128. One or more grind geometries are possible, e.g., fastener 110 may include a grind on one or, as seen in FIG. 9, both of surfaces 138, 140. Grind may terminate anywhere between, or including, surfaces 138, 140. Edges may be ground substantially to a line contact, i.e., to where grinding planes substantially intersect in the case where both surfaces are ground or to where grinding plane intersects second surface 140 in the event that only surface 138 is ground. Preferably, however, edges may be ground so as to leave a flat 156 of side 128 remaining. Ground edges 152 may be angled downwardly from their respective surfaces an amount $\theta$ that may be between about 10 degrees and about 75 degrees, preferably between about 15 degrees and about 45 degrees.

In the event that more than one edge is ground, grinds further may include a chamfer 154 between one or more ground edges 152.

Fastener 10 or 110 may be used when joining two substrates together, e.g., when joining two wooden pieces in a cabinet face frame assembly. In that application, the wooden members often are placed next to one another forming a butt joint between them, as seen in FIG. 4. The wood grain in the two members may be generally perpendicular to one another, which usually is the case when the members are joined generally perpendicularly. Alternatively, the members may be angled acutely or obtusely with respect to one another, but even then, the grain of one member usually remains offset from the other member.

Regardless of relative grain orientations, members 2, 4 may be placed in an abutted relationship to one another, and fastener 10, 110 may be driven across joint. While fastener 10, 110 may be driven in any orientation across joint, preferably fastener is driven generally perpendicular to joint, without the need to pre-drill a pilot hole. Once engaged with members, clamping apex formed by first flute and second flute may direct clamping force toward center of fastener 10, 110, drawing members 2, 4 together, preventing formation of gaps between members 2, 4, and increasing joint strength.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A corrugated fastener, comprising:
   a bridge having two opposing sides;
   a plurality of ribs extending outward from said opposing sides of said bridge along a length of said fastener; and
   a substantially planar first end extending outward from a first of said plurality of ribs and a substantially planar second end extending outward from a second of said plurality of ribs, the first end and the second end disposed on said opposing sides of said bridge, wherein said bridge is disposed at a different location along a height of the fastener than said first end and said second end,
   wherein at least one rib on each of said opposing sides includes a plurality of flutes with a first flute and a second flute, said plurality of flutes angled inwardly towards a center of said fastener,
      wherein said first end and said second end are substantially aligned with one of said plurality of ribs.

2. A fastener according to claim 1, wherein both said first flute and said second flute of said at least one rib angle inwards towards a center of said fastener substantially symmetrical about an axis perpendicular to a direction of driving of the fastener.

3. A fastener according to claim 2, wherein both said first flute and said second flute angle inwards at substantially the same degree.

4. A fastener according to claim 2, wherein both said first flute and said second flute angle inwards between about 80 degrees and about 89 degrees.

5. A fastener according to claim 2, wherein both said first flute and said second flute angle inwards about 87 degrees.

6. A fastener according to claim 1, wherein said first flute and said second flute meet at a location substantially centrally disposed width-wise on said fastener.

7. A fastener according to claim 1, wherein the at least one rib on each of said opposing sides are substantially symmetrical.

8. A fastener according to claim 1, wherein said bridge, said first end, and said second end are generally centered along said height.

9. A fastener according to claim 1, wherein said bridge is substantially planar.

10. A fastener according to claim 1, wherein at least one second rib on each side of said opposing sides includes a second plurality of flutes, said second plurality of flutes substantially aligned with the direction of driving.

11. A fastener according to claim 1, wherein at least one of a driving side, a first side, and a second side includes a ground edge.

12. A fastener according to claim 1, said plurality of ribs including a first rib proximate said bridge and a second rib proximate an end of said fastener, each of said first and second ribs having a radius of curvature, wherein said radius of curvature of said first rib is larger than said radius of curvature of said second rib.

13. The fastener according to claim 1, where said bridge further comprises a top side and a bottom side, and where said first flute forms an angle with said top side between about 75 degrees and about 89 degrees and said second flute forms an angle with said bottom side between about 75 degrees and about 89 degrees.

14. The fastener according to claim 13, wherein said bridge is between about 25% and about 50% of a total fastener length.

15. A fastener, comprising:
    a bridge;
    a first rib extending outward from a first end of said bridge and a second rib extending outward from a second end of said bridge;
    said fastener having a height, a first end disposed outward from said first rib and a second end disposed outward from said second rib, wherein said bridge is disposed at a different location along said height than said first end and said second end.

16. A fastener according to claim 15, further comprising: a plurality of ribs extending outward from said first and second ends of said bridge.

17. A fastener according to claim 15, wherein said bridge is substantially planar.

18. A fastener according to claim 15, wherein at least one of said first rib and said second rib includes a first flute and a second flute angled inwards towards a center of said fastener.

19. A fastener according to claim 18, wherein said first flute and said second flute angle inwards between about 80 degrees and about 89 degrees.

20. A fastener according to claim 18, wherein said first flute and said second flute converge at a location generally equally spaced from a first side and a second side of said fastener.

21. A fastener, comprising:
    a bridge;
    a first plurality of ribs extending outward from a first end of said bridge and a second plurality of ribs extending outward from a second end of said bridge; said first plurality of ribs comprising a first rib and a second rib;
    wherein said first rib comprises a first time and a second time, said first time and said second time converging at an apex;

wherein at least one of said first time and said second time angle inwards towards a center of said fastener;

wherein said second rib comprises a first time and a second time that are substantially aligned with one another; and wherein said bridge is disposed at a different location along a height of the fastener than said first end and said second end.

* * * * *